R. B. VAUGHN.
COOLING DEVICE FOR INTERNAL COMBUSTION ENGINES.
APPLICATION FILED AUG. 25, 1909.
971,328.
Patented Sept. 27, 1910.
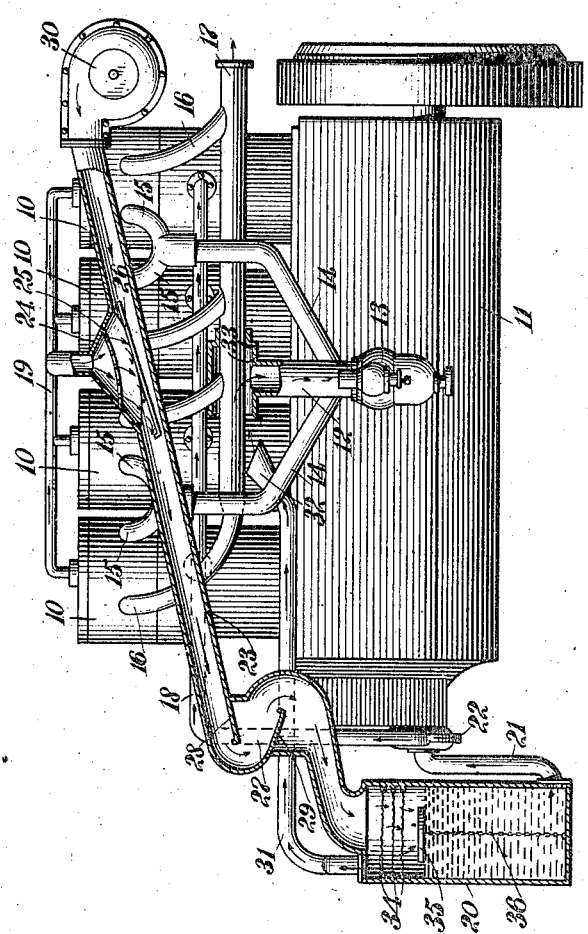
WITNESSES
INVENTOR
Ralph B. Vaughn
BY
ATTORNEYS

UNITED STATES PATENT OFFICE.

RALPH BROOKS VAUGHN, OF WILKES-BARRE, PENNSYLVANIA.

COOLING DEVICE FOR INTERNAL-COMBUSTION ENGINES.

971,328.   Specification of Letters Patent.   Patented Sept. 27, 1910.

Application filed August 25, 1909. Serial No. 514,508.

*To all whom it may concern:*

Be it known that I, RALPH BROOKS VAUGHN, a citizen of the United States, and a resident of Wilkes-Barre, in the county of Luzerne and State of Pennsylvania, have invented a new and Improved Cooling Device for Internal-Combustion Engines, of which the following is a full, clear, and exact description.

This invention relates to certain improvements in cooling devices for internal combustion engines, and more particularly to that type of cooling device in which water is circulated in the jacket of the engine and then withdrawn from the jacket and cooled by direct contact with the air.

The object of my invention is to render the device as compact as possible, yet facilitate the intimate intermixing and commingling of the air and water to uniformly and thoroughly cool the latter.

A further important object of my invention is to insure the formation of a powerful explosive in the engine cylinder, and at the same time, conserving some of the heat from the jacket by delivering to the carbureter of the engine, the moist warm air coming from the cooling device.

My invention may be utilized in apparatus of various different forms, and various changes may be made in the construction and details of the device, within the scope of the appended claims, without departing from the spirit of my invention.

The practical embodiment of the invention is represented in the accompanying drawings forming a part of this specification, in which the figure is a side elevation of the improvement as applied to an engine, parts being shown in section.

My improved cooling device may be used with internal combustion engines of any form or character, and of any size desired. For purposes of illustration, I have shown an engine having four cylinders 10, all connected to the same crank case 11. Air is drawn in through a conduit 12 to a carbureter 13, and the explosive mixture is delivered from the carbureter through conduits 14 and branch conduits 15 to the inlet ports of the several cylinders. The exhaust gas leaves the several cylinders through exhaust conduits 16, all of which lead to an exhaust manifold 17. Each cylinder has a water-cooling jacket, to all of which water may be delivered through a water delivery conduit 18, and from all of which the heated water may leave through an outlet conduit 19. None of the features so far described embody any feature of my invention. All of these parts are merely conventionally illustrated and may be replaced by their equivalents in the art.

In connection with the engine above described, I employ a water-cooling means in which air is delivered into direct and intimate contact with the water, so as to remove the heat from the latter, both by evaporation of the water and by direct cooling. This cooling means includes a water tank 20, from which the water may be drawn off through a conduit 21 by means of a rotary pump 22 and delivered to the engine jackets through the conduit 18. Leading to this tank is a diagonally-disposed conduit 23 having a wide flaring nozzle 24 delivering thereto in the upper side and adjacent the upper end. This nozzle has a perforated baffle plate 25 and is directly connected to the outlet conduit 19 for the water coming from the engine jackets. Within the conduit 23 and beneath the nozzle and perforated spraying plate 25, is a baffle plate 26 extending lengthwise of the conduit and having its lower edge upturned. The conduit 23, at its lower end, is bent back upon itself a plurality of times, so as to form a chamber 27, down through which the water and air must pass. The lower surface of the conduit 23 extends into this chamber to form a baffle 28 and a somewhat similar baffle 29 extends into the chamber from the side opposite to the conduit 23. Each of these baffles has its lower edge slightly upturned, and the chamber at its lower end delivers directly to the top of the water tank 20. At the upper end of the conduit 23 I provide a rotary blower or fan 30 of any suitable character and operated in any suitable manner, for forcing air down through said conduit. The cool air is drawn in from the outside atmosphere and forced down through the conduit 23 to the baffle 26. Here a portion of the air passes above the baffle and through the spray falling from the spray plate 25, and the remainder passes beneath the baffle plate. The sprayed water strikes the baffle plates and overflows from the lower end, and the air which passes beneath the baffle plate is forced through this falling sheet of water at the lower edge of the baffle. The water and air travel together to the lower end of the conduit 18, and as the water falls from the baffle 28 and later from the baffle 29, the air is compelled to pass through the sheet of water. The air and water are delivered together to the tank 20, and by the time they reach the tank, the air and water have reached the same temperature, which is considerably lower than the mean of the temperatures of the incoming air and water at the upper end of the conduit, as the vaporization of a portion of the water tends to lower the temperature of both the water and the air. The air and the water separate in the tank 20, the water being drawn off through the conduit 21 and returned to the jacket, while the air escapes through a conduit 31. This air is of somewhat higher temperature than the outside temperature and is also saturated with moisture, and in order to utilize this air in forming the explosive mixture, I terminate the conduit 31 in a nozzle 32, disposed closely adjacent the inlet end of the air intake pipe 12. The air intake pipe preferably is joined to a head or sleeve 33 encircling the exhaust pipe, and one end of this head or sleeve is left open, so that the air drawn in will travel along the outer surface of the exhaust pipe and become heated thereby. The delivery nozzle 32 flares outwardly and delivers against the exhaust pipe, so that the moist air will travel along the surface of the exhaust pipe and become heated before being drawn in to the end of the head or sleeve 33.

Moisture in the air aids in forming a more powerful explosive mixture and the free heating of the air aids in the vaporization of the fuel in the carbureter.

If the engine is to be used on a vehicle or otherwise subject to a jarring or a shaking action, the tank is preferably provided with a plurality of transverse perforated or reticulated partitions or plates 34, and a float 35 secured to the bottom of the tank by a suitable flexible connection 36. These plates and the float tend to prevent the water from splashing and the plates tend to facilitate the separation of the water from the air.

Having thus described my invention, I claim as new and desire to secure by Letters Patent:

1. An explosion engine provided with a cooling device comprising a water storage tank connected with the water jacket of the engine, and a spraying and cooling device having a spraying nozzle connected with the outlet of the water jacket, a spraying chamber containing the said nozzle and having connection with the said water storage tank, means for producing air currents in the said chamber to cool the sprayed water previous to its return to the said tank, and a vent pipe leading from the said tank and discharging moist hot air into the inlet pipe of the carbureter for the engine.

2. A water cooler for internal combustion engines, comprising a downwardly-inclined conduit, means for spraying into said conduit the water from the engine jacket, a fan for delivering air to said conduit at the upper end thereof, a plurality of opposed baffles adjacent the lower end of the conduit, a tank for receiving water from said conduit, means for returning the water from said conduit to the engine jacket, and means for returning the air from said tank to the inlet of the carbureter of the engine.

3. An internal combustion engine, provided with a cooling device comprising a water storage tank connected with the water jacket of the engine, a spraying and cooling device having a spraying nozzle connected with the outlet of the water jacket, a spraying chamber separate from said water tank and containing said nozzle, a conduit delivering downwardly at an incline from said spraying and cooling chamber to said water storage tank, a plurality of baffles adjacent the lower end of said conduit, and means for blowing air through said chamber and said conduit, to cool the spraying water previous to its return to said tank.

In testimony whereof I have signed my name to this specification in the presence of two subscribing witnesses.

RALPH BROOKS VAUGHN.

Witnesses:
W. H. CHAPIN,
C. PEARL WEBER.